United States Patent [19]

Babin

[11] Patent Number: 5,454,097
[45] Date of Patent: Sep. 26, 1995

[54] CASCADABLE PERIPHERAL DATA INTERFACE INCLUDING A SHIFT REGISTER, COUNTER, AND RANDOMLY-ACCESSED REGISTERS OF DIFFERENT BIT LENGTH

[75] Inventor: David C. Babin, Austin, Tex.

[73] Assignee: Motorola, Inc., Schaumburg, Ill.

[21] Appl. No.: 8,436

[22] Filed: Jan. 25, 1993

[51] Int. Cl.[6] .................... G06F 12/04; G06F 12/00; G11C 19/28; G11C 7/00

[52] U.S. Cl. .................... 395/436; 395/493; 365/189.12; 365/236; 365/238.5; 365/219; 364/DIG. 1; 364/245.1; 364/247.4; 364/DIG. 2; 364/933.3

[58] Field of Search .................... 395/425; 364/245.1, 364/247.7, 933.3, DIG. 1, DIG. 2; 365/189.12, 219, 236, 239, 240

[56] References Cited

U.S. PATENT DOCUMENTS 4,084,154  4/1978  Panigrahi .................... 395/425
5,146,577  9/1992  Babin .................... 395/425
5,262,907  11/1993  Duffy et al. .................... 395/425

Primary Examiner—Eddie P. Chan
Assistant Examiner—Reginald G. Bragdon
Attorney, Agent, or Firm—Paul J. Polansky

[57] ABSTRACT

A cascadable peripheral (10) has at least two registers (51, 52, 53) of different sizes. Input data is shifted serially through a shift register (40) synchronously with a clock signal. A serial output of the shift register (40) is provided to a data output terminal (18) of the peripheral (10) for cascading. A counter (20) increments a state in response to the clock signal. A decode portion (30, 31, 32, 33, 35) activates one of a group of load signals, corresponding to one of the registers (51, 52, 53), in response to a state of the counter (20), when an enable signal becomes inactive. The active load signal causes the corresponding register to load a value presented from a parallel data output of the shift register (40). The counter (20) is reset in response to either the enable signal becoming inactive or the counter (20) reaching a maximum count corresponding to a size of the shift register (40).

18 Claims, 2 Drawing Sheets

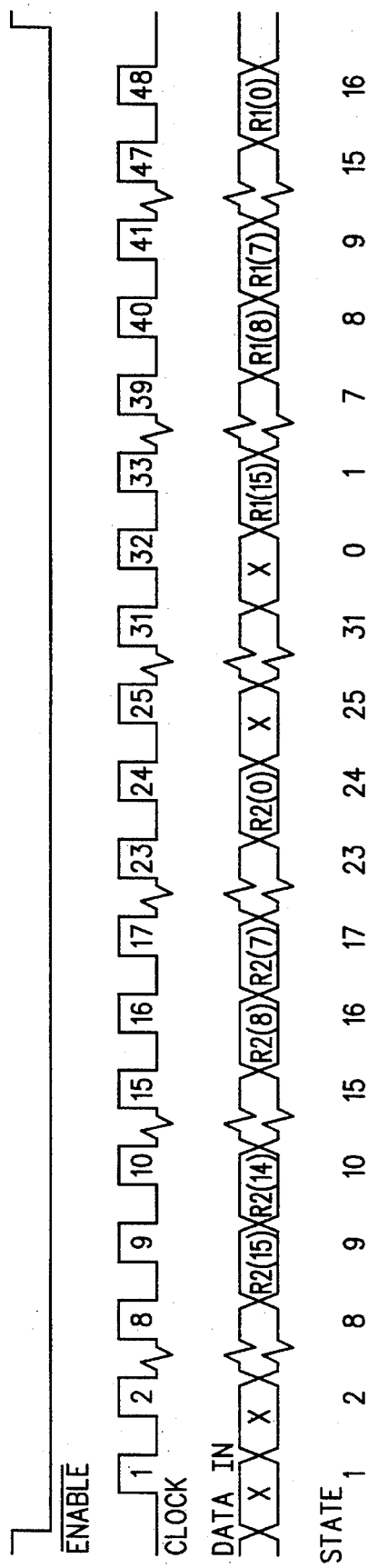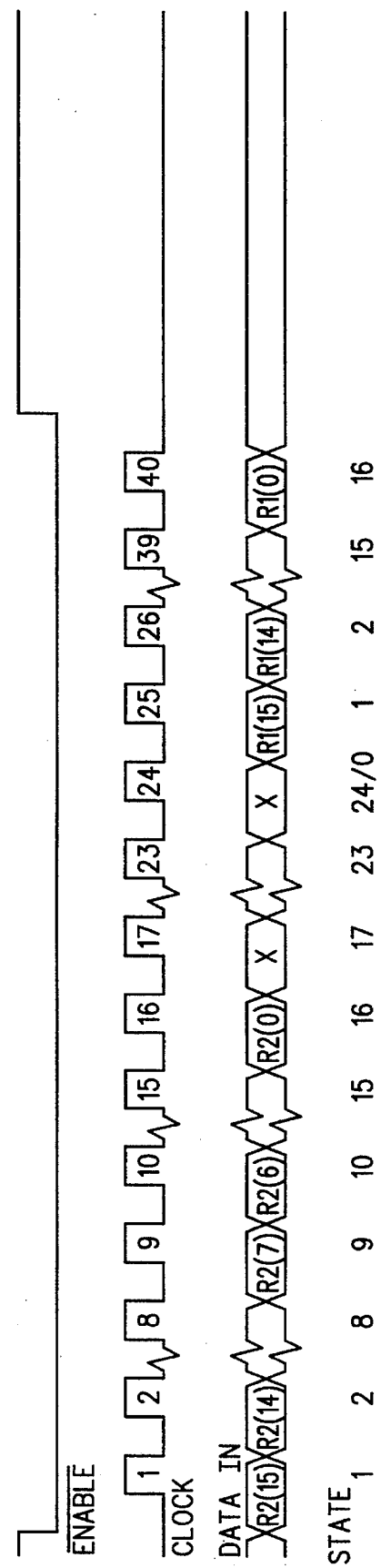

5,454,097

CASCADABLE PERIPHERAL DATA INTERFACE INCLUDING A SHIFT REGISTER, COUNTER, AND RANDOMLY-ACCESSED REGISTERS OF DIFFERENT BIT LENGTH

FIELD OF THE INVENTION

This invention relates generally to data processing systems, and more particularly, to data interfaces for cascadable peripherals.

BACKGROUND OF THE INVENTION

In general, a data processing system includes a data processor functioning as a central processing unit (CPU) of the system, memory, and peripherals connected to the data processor. In many data processing systems, the data processor is a single-chip microcontroller which has on-chip memory and peripherals, but also is connected to external memory and external peripherals. The microcontroller executes various data processing instructions in software stored in internal and external memory. The peripherals perform various functions which may or must be implemented in external hardware circuitry, rather than by the microcontroller. For example, a phase locked loop (PLL) frequency synthesizer is a peripheral which includes circuitry able to function at radio frequency (RF). Processing of RF signals is beyond the capability of most microcontrollers, which are fabricated using complimentary metal-oxide-semiconductor (CMOS) technology. Therefore, a data processing system which processes RF signals requires an off-chip PLL frequency synthesizer peripheral.

Integrated circuit peripherals often include multiple on-chip registers, which must be initialized and periodically reprogrammed by the microcontroller. These peripherals also typically include a serial data port for receiving register data. The serial data port usually includes a clock pin, an enable pin, and a data pin, and data transfer usually conforms to a known serial protocol. In order to identify a selected one of the on-chip registers, conventional peripherals also require an address bit stream to be conducted on the data pin during the initialization or reprogramming. Address bit streams, however, add to the time required to update the peripheral's registers and increase software complexity.

One technique which eliminates the need for address bits in the serial bit stream was taught by David C. Babin in U.S. Pat. No. 5,146,577, entitled "Serial Data Circuit with Randomly-Accessed Registers of Different Bit Length," issued Sep. 8, 1992. Babin teaches a peripheral which selects an on-chip register by counting the number of data bits received during a data transfer, and transferring the data to a register which has a size corresponding to the number of data bits received.

However, an additional problem remains. In order to reduce data processor pin count in systems with multiple peripheral integrated circuits, peripherals are often cascadable. The data processor can use a single data pin to transmit data to any of a number of peripherals because each peripheral has a data output pin which connects to a data input pin of a subsequent peripheral. Writing to the registers based on the bit length can require very cumbersome software calculations because of bit alignment problems when the peripherals are cascaded.

SUMMARY OF THE INVENTION

Accordingly, there is provided, in one form, a cascadable peripheral with an efficient data interface comprising a data input terminal, a shift register, a data output terminal, a counter, a decoder portion, and a plurality of registers. The data input terminal receives serial data synchronously with a clock signal when an enable signal is active. The shift register has a data input coupled to the data input terminal, a clock input for receiving the clock signal, a serial data output for providing data synchronously with the clock signal, and a parallel data output. The data output terminal is coupled to the serial data output of the shift register, and is for coupling the cascadable peripheral to a second cascadable peripheral. The counter has a clock input for receiving the clock signal, a reset input for receiving a reset signal, and a multi-bit output indicative of a state of the counter. The counter counts a number of pulses of the clock signal received while the reset signal is active. The counter is reset in response to an activation of the reset signal. The decoder portion is coupled to the counter, and provides a plurality of load signals each corresponding to one of a plurality of predetermined states, in response to the enable signal becoming inactive. The decoder portion provides the reset signal to the reset input of the counter and activates the reset signal in response to either an inactivation of the enable signal or to a maximum count signal. The decoder portion activates the maximum count signal in response to the state of the counter being equal to a size of the shift register. Each register of the plurality of registers has a load input receiving a corresponding one of the plurality of load signals and a multi-bit data input coupled to at least a part of the parallel data output of the shift register.

In another form, there is provided a method for efficient data interfacing in a cascadable peripheral. A clock signal is received at an input of a counter during a time period in which an enable signal is active. Serial data is received at an input terminal of the cascadable peripheral synchronously with the clock signal. The serial data is shifted through a shift register synchronously with the clock signal. Data is provided from a serial output of the shift register to an output terminal of the cascadable peripheral synchronously with the clock signal. The counter is reset in response to a state of the counter reaching a maximum count. The maximum count is equal to a size of the shift register. An output of the counter is decoded in response to the enable signal becoming inactive, to activate one of a plurality of load signals. A selected register of a plurality of registers corresponding to the load signals, is loaded from a parallel output of the shift register.

These and other features and advantages will be more clearly understood from the following detailed description taken in conjunction with the accompanying drawings.

BRIEF DESCRIPTION OF THE DRAWINGS

FIG. 2 illustrates a timing diagram of a cascadable peripheral of the prior art.

FIG. 3 illustrates a timing diagram associated with the cascaded peripheral of FIG. 1.

DETAILED DESCRIPTION OF A PREFERRED EMBODIMENT

Figure 1:
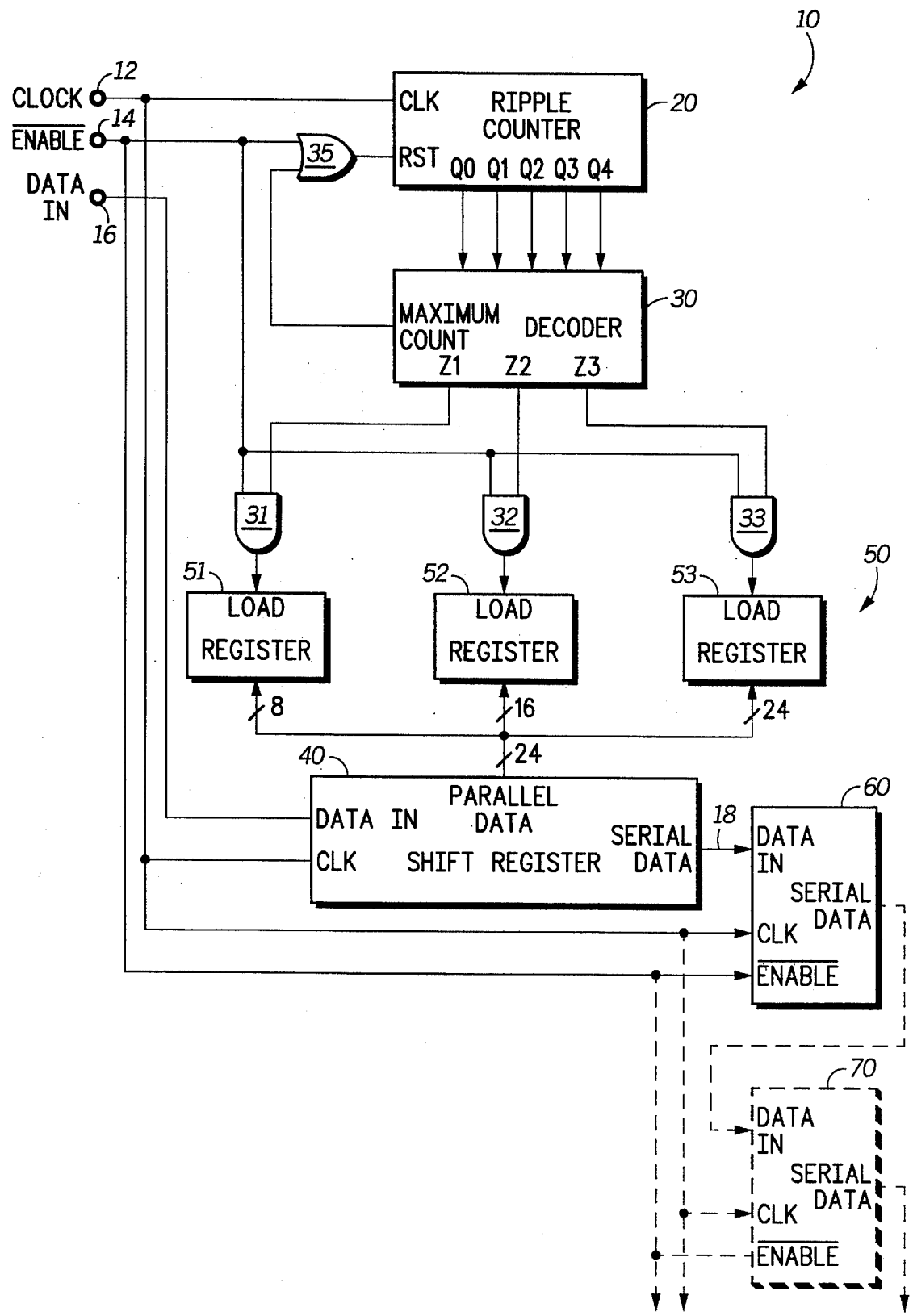
FIG. 1 illustrates in block diagram form a cascadable peripheral with an efficient data interface in accordance with the present invention.

FIG. 1 illustrates in block diagram form a cascadable peripheral with an efficient data interface 10 in accordance with the present invention. Peripheral 10 is a monolithic integrated circuit which receives serial data and loads the received data into an appropriately sized-register which is selected out of a serial bit stream of varying bit size. Peripheral 10 also provides data serially to a subsequent peripheral 60 in a string of cascaded peripherals. Peripheral 10 resets an internal counter not in response to the counter reaching its terminal count, but rather in response to the counter reaching a state corresponding to a size of an internal shift register. Thus, the serial bit stream is aligned for each subsequent peripheral and unnecessary "dummy" bits and programming complexity are avoided.

Peripheral 10 includes generally a ripple counter 20, a decoder 30, AND gates 31–33, an OR gate 35, a shift register 40, and registers 51–53. Peripheral 10 also includes a clock terminal 12 for receiving a clock signal labelled "CLOCK", an active-low enable input terminal 14 for receiving a signal labelled "$\overline{ENABLE}$", a serial data input terminal 16 for receiving a serial data stream labelled "DATA IN", and a serial data output terminal 18.

Counter 20 has a clock input connected to terminal 12 for receiving signal CLOCK thereon, a reset input terminal labelled "RST", and output terminals labelled "Q0", "Q1", "Q2", "Q3", and "Q4". Counter 20 is a resettable modulo-32 ripple counter which counts from zero to thirty one. Signals Q0–Q4 represent a binary-encoded state in which Q0 is the least significant bit, Q1 is the second least-significant bit, etc. Alternatively, ripple counter 20 may be replaced by an asynchronous counter, a synchronous binary counter, a Johnson counter, or the like.

Decoder 30 has an input connected to outputs Q0–Q4 of counter 20, and an output for providing four decoded signals labelled "Z1", "Z2", "Z3", and "MAXIMUM COUNT". Decoder 30 uses combinational logic to decode load signals Z1–Z3 and MAXIMUM COUNT in response-to the state of signals Q0–Q4. Z1 corresponds to register 51 and is active when counter 20 reaches eight (when Q4–Q0 is equal to 01000 binary). Z2 corresponds to register 52 and is active when counter 20 reaches 16 (when Q4–Q0=10000 binary). MAXIMUM COUNT is active when counter 20 reaches 24 (when Q4–Q0=11000 binary). Z3 corresponds to register 53 and is active a propagation delay after MAXIMUM COUNT resets counter 20 (to Q4–Q0=00000 binary).

AND gate 31 has a first input terminal for receiving signal $\overline{ENABLE}$, a second input terminal for receiving signal Z1, and an output terminal. Register 51 has a positive edge-triggered load input terminal labelled "LOAD" connected to the output terminal of AND gate 31, and an 8-bit data input terminal. AND gate 32 has a first input terminal for receiving signal $\overline{ENABLE}$, a second input terminal for receiving signal Z2, and an output terminal. Register 52 has a positive edge-triggered LOAD input terminal connected to the output terminal of AND gate 32, and a 16-bit data input terminal. AND gate 33 has a first input terminal for receiving signal $\overline{ENABLE}$, a second input terminal for receiving signal Z3, and an output terminal. Register 53 has a positive edge-triggered LOAD input terminal connected to the output terminal of AND gate 31, and an 24-bit data input terminal. Registers 51–53 also include additional outputs, not shown, for connecting the bits stored therein to additional circuitry to control the operation of peripheral 10.

Each of registers 51–53 is loaded in response to a low voltage-to-high voltage transition of a corresponding load signal. Each load signal is formed by a logical AND of a corresponding decoded signal of decoded signals Z1–Z3, and signal $\overline{ENABLE}$. Thus if counter 20 has reached a state of eight when signal $\overline{ENABLE}$ becomes inactive (at a logic high), register 31 is loaded with an 8-bit value; if counter 20 has reached a state of sixteen when signal $\overline{ENABLE}$ becomes inactive, register 32 is loaded with a 16-bit value; and if counter 20 has reached a state of zero when signal $\overline{ENABLE}$ becomes inactive, register 31 is loaded with a 24-bit value. In accordance with the present invention, counter 20 is reset to zero upon reaching a state of twenty-four, instead of being reset internally on the next clock after reaching a state of thirty-one. OR gate 35 has a first input terminal for receiving signal $\overline{ENABLE}$, a second input terminal for receiving signal MAXIMUM COUNT, and an output terminal connected to the RST input terminal of counter 20. Counter 20 is reset in response to either signal $\overline{ENABLE}$ becoming inactive (at a logic high), or to signal MAXIMUM COUNT becoming active. Thus, a propagation delay after counter 20 reaches a MAXIMUM COUNT of twenty-four, decoder 30 activates signal Z3 and register 53 is loaded if signal $\overline{ENABLE}$ then becomes inactive. Note that the load signals at the outputs of AND gates 31–33 are active only for a short duration equal to the propagation delay through OR gate 35, counter 20, decoder 30, and the appropriate AND gate. Since peripheral 10 uses complementary metal-oxide-semiconductor (CMOS) technology, this propagation delay is sufficient to cause registers 51–53 to recognize the positive edge-triggered load inputs. If a faster transistor technology is used, additional delay logic may be required.

Shift register 40 has a data input terminal labelled "DATA IN" connected to terminal 16 for receiving DATA IN thereon, a clock input terminal labelled "CLK" connected to terminal 12 for receiving signal CLOCK thereon, a serial data output terminal labelled "SERIAL DATA", and a 24-bit parallel data output terminal labelled "PARALLEL DATA" coupled to the data input terminals of registers 51–53. The eight parallel data bits received by register 51 correspond to a first sequential eight bit positions in shift register 24; the sixteen parallel data input bits received by register 52 correspond to a first sequential sixteen bit positions in shift register 24; and the twenty-four parallel data bits received by register 53 correspond to all twenty-four bit positions in shift register 24.

FIG. 1 also illustrates a second peripheral 60 having similarly labelled CLK, $\overline{ENABLE}$, DATA IN, and SERIAL DATA terminals corresponding to terminals 12, 14, 16, and 18 of peripheral 10, respectively; and an optional third peripheral 70 having similar terminals with similar designations. Peripheral 70 illustrates that while the present invention decreases access time and programming complexity for data processing systems having two cascaded peripherals, the advantages become larger as more peripherals are added.

Peripheral 10 is especially suited for systems cascading peripherals with similar data interfaces. When a subsequent peripheral (such as peripheral 60) is to be programmed, bit fields align with a boundary defined by the shift register size. This consistency simplifies programming and avoids the programming time required to align the bits while having counter 20 at the proper state. In the illustrated embodiment, shift register 40 has the same size as the largest register 53. However, in another embodiment, the shift register may be larger than the largest register. These relative sizes would be desirable when the peripheral includes two registers of the same size. For example, a peripheral having two 23-bit registers also has a 24-bit shift register. The shift register shifts in data corresponding to the twenty-three bits of one of the registers, and an address or steering bit to determine which of the two registers is to receive the data. Resetting the counter when it reaches a state corresponding to the size of the shift register ensures that data for subsequent peripherals will be aligned.

The ease of programming peripheral 10 is more clearly understood by timing diagrams of the appropriate signals. FIG. 2 illustrates a timing diagram of a cascadable peripheral of the prior art, using only the non-address based programming feature of U.S. Pat. No. 5,146,577, and not using an apparatus according to the present invention. FIG. 2 illustrates the three signals associated with the data port, namely $\overline{\text{ENABLE}}$, CLOCK, and DATA IN, and also the value of the counter labelled "COUNT". FIG. 2 illustrates the timing for a system having two cascaded peripherals; timing for systems with greater numbers of cascaded peripherals should be apparent therefrom. Signals $\overline{\text{ENABLE}}$ and CLOCK are received by both peripherals; signal DATA IN represents data received at the data input terminal of the first of the two cascaded peripherals; and STATE represents the state of the ripple counter of both the first and second cascaded peripherals.

At the beginning of a programming cycle, a data processor (not shown in FIG. 1) activates signal $\overline{\text{ENABLE}}$ at a logic low. The data processor also provides signal CLOCK. The peripheral's counter begins counting, and logic high times of signal CLOCK are numbered sequentially from 1 to 48. In order to program the 16-bit registers in two cascaded peripherals, an extra eight bits ("dummy" bits) are required during clock cycles 1–8. These dummy bits are labelled with the symbol "X", representing a don't-care condition. Beginning with clock cycle 9, register data for the second peripheral is received at the data input of the first peripheral's shift register, most-significant bit first. For example, at CLOCK cycle 9, a data value labelled "R2(15)" and corresponding to the most-significant bit of the 16-bit register is received. Other data bits are similarly labelled. During CLOCK cycle 24, the first peripheral receives least-significant bit R2(0). However, the modulo-32 counter counts for an additional eight CLOCK cycles, and rolls over to 0 at the thirty-second cycle. From CLOCK cycle 33 to CLOCK cycle 48, register bits from R2(15) to R2(0), are provided as the SERIAL DATA out of the first peripheral's shift register into the shift register of the second peripheral, and a new 16-bit value R1(15)–R1(0) is shifted into the first peripheral's shift register. At the end of CLOCK cycle 48, the 16-bit register data for both peripherals has been received and is aligned in the first sixteen bit positions of their respective shift registers. Signal $\overline{\text{ENABLE}}$ becomes inactive, and the first and second peripherals load the data in their shift registers into their 16-bit registers.

In order to accomplish this alignment (counters at sixteen and register bits in the first sixteen bit positions of their respective shift registers), a software program must insert additional dummy bits at various positions in the DATA IN bit stream, based on the number of cascaded peripherals and the register size accessed. There are at least two disadvantages to this approach. First, as the number of cascaded devices increases, the amount of computation time and the extra programming instructions required to calculate the bit alignment and counter state increases significantly. Second, the leading dummy bits (during CLOCK cycles 1–8 in FIG. 2) slow the peripherals' programming.

FIG. 3 illustrates a timing diagram associated with cascaded peripheral 10 of FIG. 1. Like FIG. 2, FIG. 3 illustrates the programming of the 16-bit register of two cascaded peripherals, both identical to peripheral 10. Instead of eight leading dummy bits, the second peripheral's register data is input immediately, most-significant bit first. After CLOCK cycle 16, in which bit R2(0) is received, peripheral 10 requires only eight dummy bits to increment the STATE to 24, at which point it is reset to zero. During the following sixteen CLOCK cycles, the first peripheral's 16-bit register data is received through DATA IN, and at the end of CLOCK cycle 40, the 16-bit register data is aligned in both peripherals and the counter state is equal to sixteen in both peripherals. A software program programming peripheral 10 need only include additional 24-bit groups to align bits for each additional peripheral. Thus, no time-consuming bit alignment calculations are required when an arbitrary number of peripherals are cascaded. The programming of two peripherals identical to peripheral 10 is also faster; in the illustrated example, eight fewer clock cycles are required to program the 16-bit registers of two peripherals.

While the invention has been described in the context of a preferred embodiment, it will be apparent to those skilled in the art that the present invention may be modified in numerous ways and may assume many embodiments other than that specifically set out and described above. For example, the data interface is applicable to any cascadable peripheral with two or more registers, such as PLL frequency synthesizers, display drivers, analog-to-digital converters (ADCs), digital-to-analog converters (DACs), etc. As used herein, the word "register" includes any type of storage element for data. Furthermore, input signals, decoders, and logic gates may be implemented variously based on either active-high logic levels, active-low logic levels, or some combination of the two. Accordingly, it is intended by the appended claims to cover all modifications of the invention which fall within the true spirit and scope of the invention.

I claim:

1. A cascadable peripheral with an efficient data interface comprising:

a data input terminal for receiving serial data synchronously with a clock signal when an enable signal is active;

a shift register having a data input coupled to said data input terminal, a clock input for receiving said clock signal, a serial data output for providing data synchronously with said clock signal, and a parallel data output;

a data output terminal coupled to said serial data output of said shift register, for coupling the cascadable peripheral to a second cascadable peripheral;

a counter having a clock input for receiving said clock signal, a reset input for receiving a reset signal, and a multi-bit output indicative of a state of said counter, said counter counting a number of pulses of said clock signal received while said reset signal is inactive, said counter being reset in response to an activation of said reset signal;

decoder means coupled to said counter, for providing a plurality of load signals each corresponding to one of a plurality of predetermined states, in response to said enable signal becoming inactive, and for providing said reset signal to said reset input of said counter;

said decoder means activating said reset signal in response to either an inactivation of said enable signal or to a maximum count signal, said decoder means activating said maximum count signal in response to said state of said counter being equal to a size of said shift register; and a plurality of registers each having a load input receiving a corresponding one of said plurality of load signals and a multi-bit data input coupled to at least a part of said parallel data output of said shift register.

2. The cascadable peripheral of claim 1 wherein said size of said shift register is equal to a size of a largest one of said plurality of registers.

3. The cascadable peripheral of claim 1 wherein said load input of each of said plurality of registers is characterized as being edge-triggered.

4. The cascadable peripheral of claim 2 wherein said decoder means provides a load signal corresponding to said largest one of said plurality of registers in response to said counter being reset and said enable signal becoming inactive.

5. The cascadable peripheral of claim 1 wherein said decoder means comprises:

a decoder having an input for receiving said multi-bit output of said counter, and an output for providing a plurality of decoded signals and said maximum count signal, each decoded signal corresponding to one of said plurality of registers and activated in response to said state of said counter equalling a corresponding one of said plurality of predetermined states;

first logic means coupled to said decoder, for activating said one of said plurality of load signals in response to said enable signal becoming inactive and to said decoder activating a corresponding one of said plurality of decoded signals; and second logic means for activating said reset input of said counter in response to either said enable signal being inactive or to said maximum count signal being active.

6. The cascadable peripheral of claim 5 wherein said first logic means comprises a plurality of AND gates, each AND gate having a first input terminal for receiving said enable signal, a second input terminal for receiving a corresponding decoded signal, and an output terminal for providing a corresponding load signal.

7. The cascadable peripheral of claim 5 wherein said second logic means comprises an OR gate having a first input terminal for receiving said enable signal, a second input terminal for receiving said maximum count signal, and an output terminal coupled to said reset input terminal of said counter.

8. The cascadable peripheral of claim 1 wherein said counter comprises a ripple counter.

9. A cascadable peripheral with an efficient data interface comprising:

counter means for receiving and counting a number of cycles of a clock signal, and for generating a multi-bit output indicative of a state of said counter means, said state being equal to a number of cycles of said clock signal received while a reset signal received at a reset input thereof is active;

shift register means for receiving serial data at a data input terminal synchronously with said clock signal, for shifting said serial data once for each cycle of said clock signal, for providing data to a serial data output terminal synchronously with said clock signal, and for providing data to a parallel output thereof representative of data being shifted through said shift register means;

decoder means coupled to said counter means and to said shift register means, for providing a plurality of load signals each corresponding to one of a plurality of predetermined states, in response to said enable signal becoming inactive, and for providing said reset signal to said reset input of said counter;

said decoder means activating said reset signal in response to either an inactivation of said enable signal or to a maximum count signal, said decoder means activating said maximum count signal when said state of said counter means equals a size of said shift register means; and a plurality of registers, each register corresponding to one of said plurality of predetermined states, each register having a load input receiving a corresponding one of said plurality of load signals and a multi-bit data input coupled to at least a part of said parallel output of said shift register means.

10. The cascadable peripheral of claim 9 wherein said size of said shift register means is equal to a size of a largest one of said plurality of registers.

11. The cascadable peripheral of claim 9 wherein said load input of each of said plurality of registers is characterized as being edge-triggered.

12. The cascadable peripheral of claim 10 wherein said decoder means provides a load signal corresponding to said largest one of said plurality of registers in response to said counter being reset and said enable signal becoming inactive.

13. The cascadable peripheral of claim 9 wherein said decoder means comprises:

a decoder having an input for receiving said multi-bit output of said counter, and an output for providing a plurality of decoded signals and said maximum count signal, each decoded signal corresponding to one of said plurality of registers and activated in response to said state of said counter equalling a corresponding one of said plurality of predetermined states;

first logic means coupled to said decoder, for activating said one of said plurality of load signals in response to said enable signal becoming inactive and to said decoder activating a corresponding one of said plurality of decoded signals; and second logic means for activating said reset signal in response to either said enable signal being inactive or to said maximum count signal being active.

14. The cascadable peripheral of claim 13 wherein said first logic means comprises a plurality of AND gates, each AND gate having a first input terminal for receiving said enable signal, a second input terminal for receiving a corresponding decoded signal, and an output terminal for providing a corresponding load signal.

15. The cascadable peripheral of claim 13 wherein said second logic means comprises an OR gate having a first input terminal for receiving said enable signal, a second input terminal for receiving said maximum count signal, and an output terminal coupled to said reset input terminal of said counter.

16. The cascadable peripheral of claim 9 wherein said counter means comprises a ripple counter.

17. A method for efficient data interfacing in a cascadable peripheral, comprising the steps of:

receiving a clock signal at an input of a counter during a time period in which an enable signal is active;

receiving serial data at an input terminal of the cascadable peripheral synchronously with said clock signal;

shifting said serial data through a shift register synchronously with said clock signal;

providing data from a serial output of said shift register to an output terminal of the cascadable peripheral synchronously with said clock signal;

resetting said counter in response to a state of said counter reaching a maximum count, said maximum count equal to a size of said shift register;

decoding an output of said counter in response to said enable signal becoming inactive to activate one of a plurality of load signals;

loading a selected register of a plurality of registers corresponding to said load signals, from a parallel output of said shift register.

18. The method of claim 17 wherein said step of resetting said counter further comprises the step of resetting said counter in response to a state of said counter reaching a maximum count, said maximum count further equal to a size of size of a largest one of said plurality of registers.

* * * * *